United States Patent [19]

Scriber et al.

[11] Patent Number: 5,272,662
[45] Date of Patent: Dec. 21, 1993

[54] CARRY MULTIPLEXED ADDER

[75] Inventors: Michael W. Scriber, Milwaukee, Oreg.; Joanne E. DeGroat, Westinghouse, Ohio; Erik J. Fretheim, Dayton, Ohio

[73] Assignee: The United States of America as represented by the Secretary of the Air Force, Washington, D.C.

[21] Appl. No.: 982,250

[22] Filed: Nov. 25, 1992

Related U.S. Application Data

[63] Continuation of Ser. No. 649,781, Jan. 31, 1991, abandoned.

[51] Int. Cl.$^5$ .............................................. G06F 7/50
[52] U.S. Cl. ...................................................... 364/788
[58] Field of Search ........................................ 364/788

[56] References Cited

U.S. PATENT DOCUMENTS

| | | | |
|---|---|---|---|
| 4,525,797 | 6/1985 | Holden | 364/788 |
| 4,623,982 | 11/1986 | Ware | 364/788 |
| 4,675,837 | 6/1987 | Ulbrich et al. | 364/788 |
| 4,682,303 | 7/1987 | Uya | 364/788 |
| 4,704,701 | 11/1987 | Mazin et al. | 364/788 |
| 4,764,888 | 8/1988 | Holden et al. | 364/788 |
| 4,811,272 | 3/1989 | Wolrich et al. | 364/788 |
| 5,027,311 | 6/1991 | Zion | 364/788 |

OTHER PUBLICATIONS

Uya et al., "A CMOS Floating Point Multiplier" *IEEE J. of Solid-State Circuits*, vol. SC-19 No. 5 Oct. 1984, pp. 697-701.

Ryan, "Intel's 80960: An Architecture Optimized For Embedded Control" *IEEE Micro* Jun. 1988, p. 63.

Dadda, "Some Schemes for Parallel Multipliers" *Maggio* vol. XXXIV No. 5, 1965, pp. 349-356.

MacSorley, "High-Speed Arithmetic in Binary Computers" *Proceeding of the IRE* Jan. 1961 pp. 67-91.

Bedrij, "Carry-Select Adder" IRE Trans. on Electronic Computers Jun. 1962 pp. 340-346.

*Computer Arith.*, Kai Hwang, John Wiley & Sons, New York, pp. 74-85.

Technology Development and Circuit Design for a Parallel Laser Programmable Floating Point Application Specific Processor, Michael W. Scriber, Thesis, AFIT/GCE/ENG/89.

*Primary Examiner*—David H. Malzahn
*Attorney, Agent, or Firm*—Gerald B. Hollins; Thomas L. Kundert

[57] ABSTRACT

A binary add signal selection type wherein carry signals rather than the usual sum signals are selected from presumed signals by multiplex switching in each bit slice cell of the adder. The new adder is organized into propagation delay time determined stages which include a plurality of sub-stages of multiple bit slice cells each with the carry signals from a previous stage performing the multiplex carry-selection in each stage. The resulting adder is of regular circuit form and adapted to modern fabrication techniques including VLSI and standard cell arrangements. Mathematical and graphic comparison of the new adder with plural existing adder architectures are included.

28 Claims, 9 Drawing Sheets

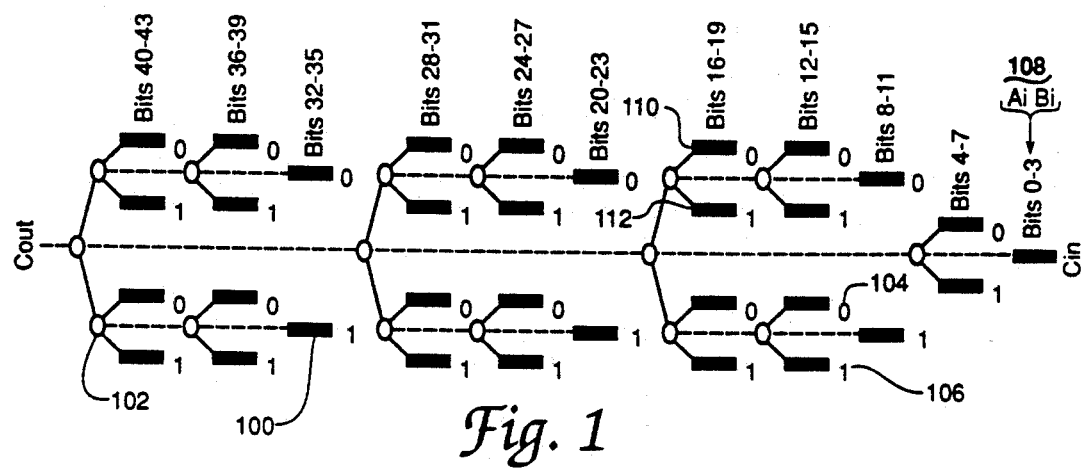
Fig. 1
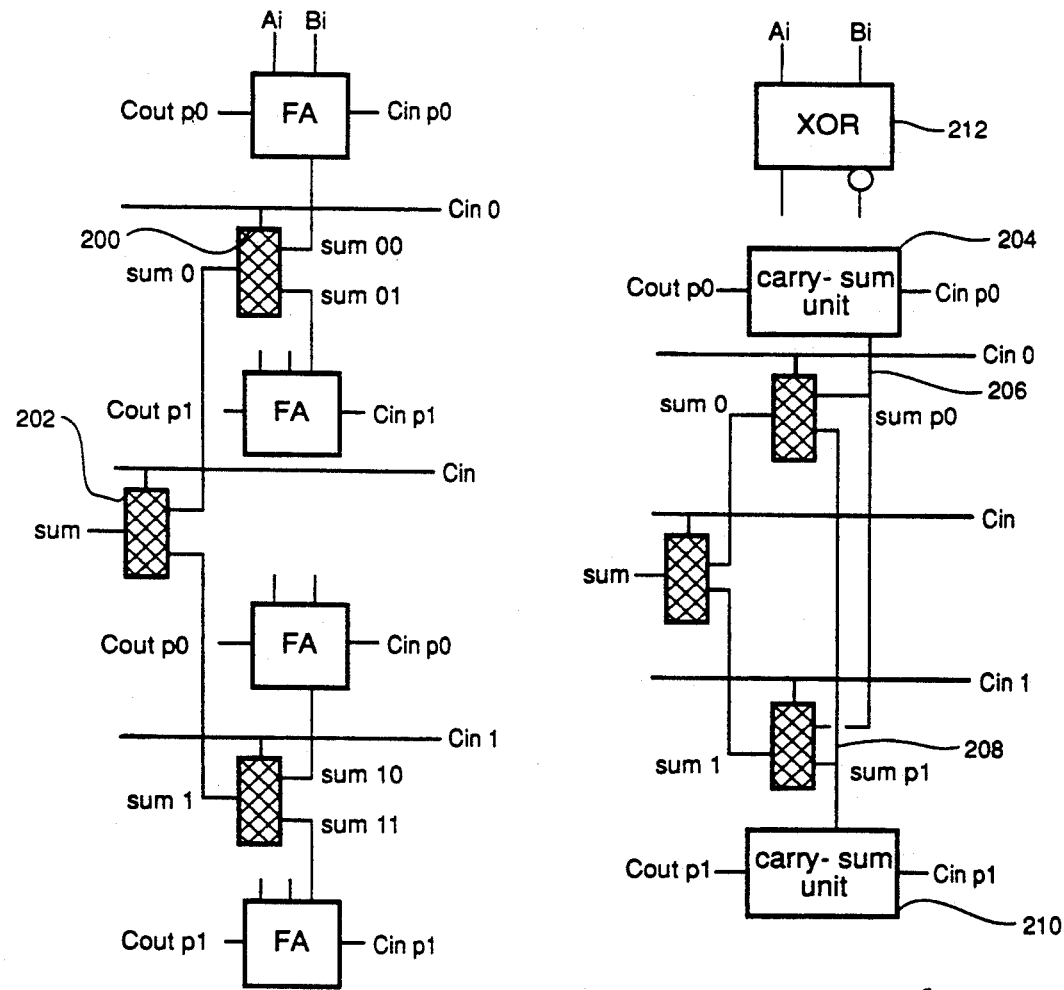
Fig. 2a
Fig. 2b

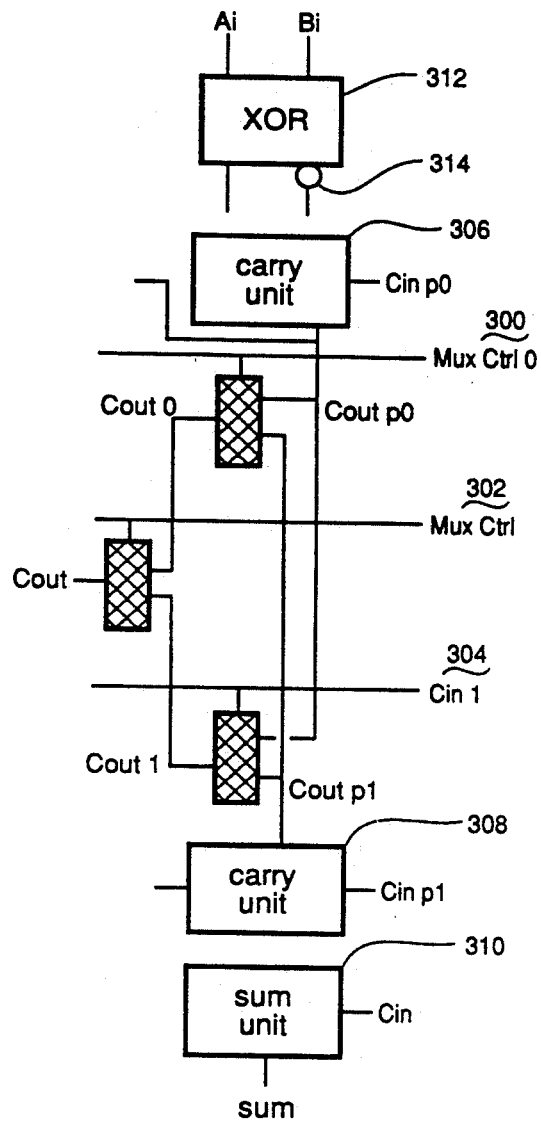 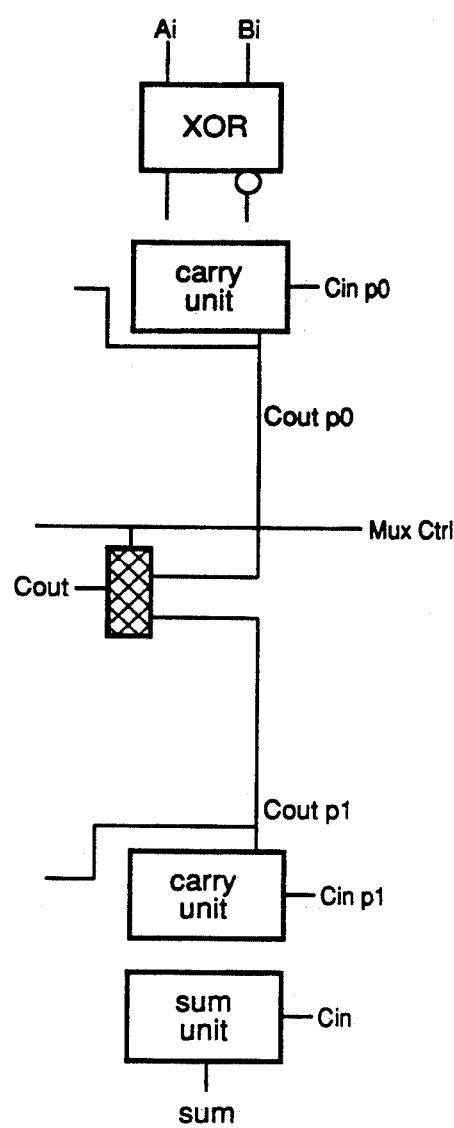
Fig. 3a    Fig. 3b
Fig. 4
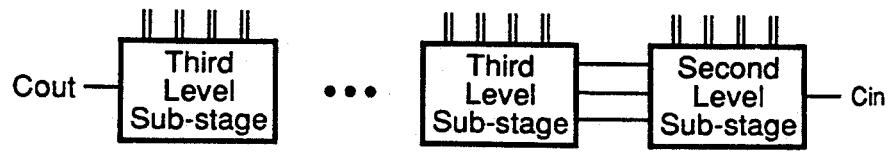
Fig. 5

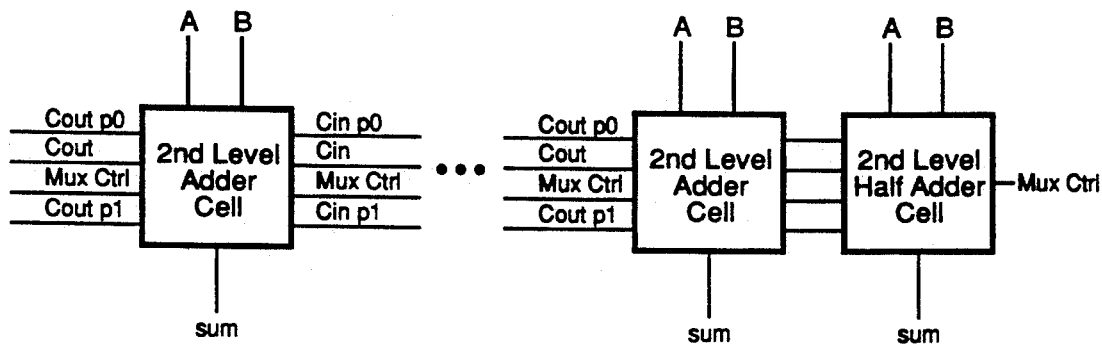
Fig. 6
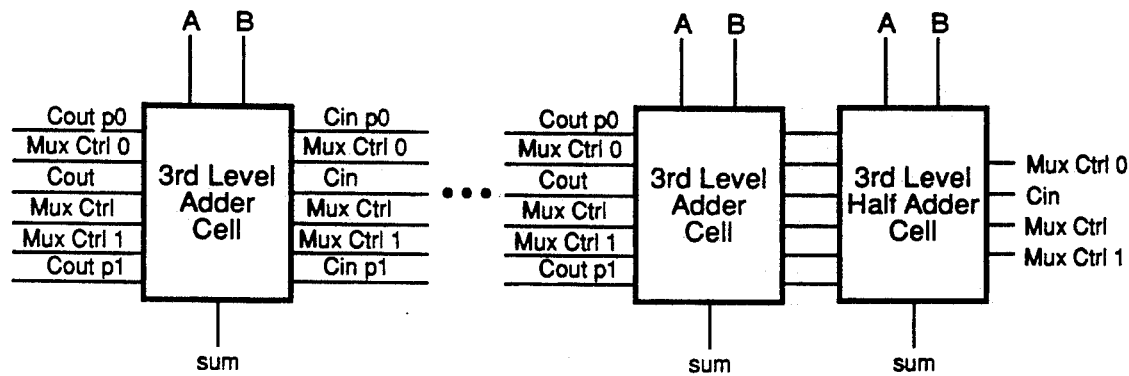
Fig. 7
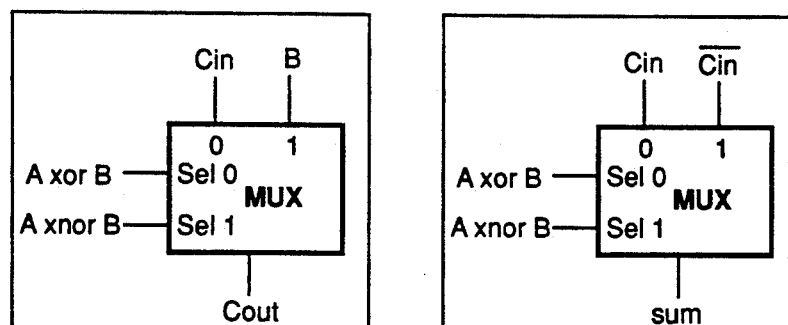
Fig. 8a    Fig. 8b
Fig. 8

CARRY MULTIPLEXED ADDER

RIGHTS OF THE GOVERNMENT

The invention described herein may be manufactured and used by or for the Government of the United States for all governmental purposes without the payment of any royalty.

CROSS REFERENCE TO RELATED APPLICATION

The present application relates somewhat to the copending patent application "High Order Carry Multiplexed Adder", Ser. No. 07/649,787, which is filed Jan. 31, 1991, now U.S. Pat. No. 5,229,459.

BACKGROUND OF THE INVENTION

This invention relates to the field of binary adders and to a new signal selection adder architecture which improves both propagation time and adder fabrication space or circuit area requirements for such adders.

Binary addition improvements have been the subject of intensive investigation especially in the period since the commercial advent of the digital computer in the 1940's and 1950's. A principal stimulus for this effort arises from the limitation in computation speed created by the time for accomplishing addition—the most basic and often used of the computer arithmetic operations. In such addition moreover a limiting consideration is the time for rippling of the carry signal through the adder stages.

The time to compute a sum has therefore received attention because it carries such significant weight within any computer system. In even the most fundamental microprocessor chip there are, for example, numerous adders, incrementers, comparators, and in some current architectures, multipliers, all of which employ addition. Also, computer Arithmetic Logic Units perform addition on data, and a program counter must be incremented or modified—frequently through the use of complement addition. Most of these addition inclusive units are, of even further significance, located on the critical path of a system. The achievable clock period and the overall computation speed of a system architecture is therefore often directly related to the time required to perform addition.

Reducing the time to perform addition, however, typically requires an increase in circuit area, as the increase in performance is often achieved through the use of non-minimized and/or redundant circuits. This results in faster but larger adder circuits. The area-time product may therefore be used to measure the effectiveness of an architecture by contrasting the trade-off between increased performance and increased circuit area. Using an adder that is fast or faster than current methods, and also has a lower area-time product, thereby results in a system that is significantly improved over the state of the art.

The basis for adder limitations in a system arises from the inherent nature of the binary number system and from the fact that in this system a final sum bit is data dependent upon the value of all addend and augend bits supplied to the adder down to the lowest or least significant bit. This situation is discussed, for example, in the article "High-Speed Arithmetic In Binary Computers" written by O. L. MacSoley and published in the proceedings of The Institute of Radio Engineers pages 67-91 in January 1961.

Several methods have been developed to reduce the time required for computing the carry signal contribution to the most significant bit position of a sum. Some of these methods are, for example, known by the names of carry-look ahead, Manchester carry chain, and carry-select. Other methods such as carry save, Wallace trees, and Dadda trees have application in multipliers but are not relevant where addition only is considered. For the methodologies that are relevant, in addition to the time to produce a complete sum, an important factor to be considered is the average number of gates per bit slice required to implement the adder architecture. As circuit area is directly related to the gate count, it is common to use the gate count as representative of area. For the area-time metric, a similarly valid metric for comparison of these circuits is a gate-time product.

The carry-select adder from this group provides a convenient starting point for discussion of the present invention. The carry select adder has been described in numerous parts of the technical literature. Included in these descriptions is the article "Carry-Select Adder" authored by O. J. Bedrij appearing in the June 1962 issue of the Institute Of The Radio Engineers Publication "Transactions on Electronic Computers" commencing at page 340. The carry-select adder is also described in text books including the text "Computer Arithmetic Principles-Architecture and Design" authored by Kai Hwang, and published by John Wiley and Sons 1979, especially commencing at page 81. FIGS. 3.7 and 3.8 located on pages 82 and 83 of the Hwang text are particularly descriptive of a carry-select adder. Both the Bedrij and Hwang publications are hereby incorporated by reference herein.

The carry-select adder provides a trade off between optimal area and optimal processing time in an adder. The carry-select adder is in fact of the order of n, the number of bits, in area requirement and of the order of the square root of n in time delay generation. An underlying principle of carry-select addition is to break the adder up into stages in which the sum is computed for both the case of a zero and a one carry input. Then when the carry from the previous stage is computed and ready, the correct sum output is chosen along with the correct carry output for the stage. After the initial stage's time delay, proper sizing of the number of bits in each successive stage increases the time by only one gate delay with this delay coming from multiplexing of the correct carry from one stage to the next. The present invention can be considered to evolve from the carry-select adder but significantly improves upon several aspects of this carry-select adder.

The patent art also shows examples of the carry-select and related adders which are of general interest with respect to the present invention. Included in this patent art is the U.S. Pat. Nos. 4,525,797 of K. N. Holden; 4,704,701 of M. Mazin et al.; and 4,764,888 also of K. N. Holden et al. all of which are concerned with variations of the carry-select adder and U.S. Pat. No. 4,811,272 of G. M. Wolrich which is concerned with an improved floating point operation in an arithmetic logic unit. Although each of these prior patents relates to an improvement in the structure of a conditional adder none includes the circuit area conserving and optimized relationship between addend and augend bit count and propagation delay offered by the adder of the present invention.

SUMMARY OF THE INVENTION

The present invention also accomplishes a combining of certain redundant logic functions in parallel processed adder cells of a binary tree adder.

The adder resulting from these changes is shown to be improved with respect to fabrication cost, operating speed, and physical size in comparison with other adder arrangements.

The present invention adder discloses the use of switching or commutating or multiplexer or mux circuits to choose a correct carry output signal of an addition in lieu of the carry-select adder arrangement of using multiplexers to select the correct sum output of an adder.

It is therefore an object of the present invention to provide an improved selective type of adder.

It is another object of the invention to provide an improved bit slice cell structure for a selective adder.

It is another object of the invention to provide a selective adder having reduced exclusive or and exclusive nor generation and also carry signal generation, and sum signal generation logic circuit requirements.

It is another object of the invention to provide a selective adder in which treed or layered multiplexer circuits are used in a time sequence to select a correct carry output.

It is another object of the invention to provide an adder arrangement which enables the processing of an increased number of addend and augend input bits per unit of gate delay time with respect to a carry-select adder.

It is another object of the invention to provide an adder configuration characterized by performance growth at a cube root function of time rate while incurring only a linear logic complexity or area rate of growth.

It is another object of the invention to provide an adder arrangement wherein the growth of logic gate requirements with respect to the number of sum bits lies between the growth rate for a ripple adder and the growth rate for a carry-select adder and is significantly better than the growth rate for a carry-look-ahead adder.

It is another object of the invention to provide an adder configuration in which the growth of gate delay time with the number of sum bits is improved over the carry-select adder and the carry-look-ahead adder and only slightly greater than the modified look-ahead adder.

It is another object of the invention to provide a fast adder architecture having a minimal area-time product.

It is another object of the invention to provide an adder which can be implemented using a small first stage adder together with additional very large scale integrated (VLSI) adder cells of the type disclosed.

It is another object of the invention to provide newly arranged bit slice cells for adders.

It is another object of the invention to provide a novel interconnecting arrangement for the newly provided bit slice cells.

Additional objects and features of the invention will be understood from the following description and claims and the accompanying drawings.

These and other objects of the invention are achieved by binary adder bit slice cell apparatus comprising the combination of a first order bit slice cell having an exclusive or and exclusive nor Boolean function generating circuit, a presumed zero carry circuit, a presumed one carry circuit, a Boolean sum circuit, and a carry signal selection circuit, the exclusive or and exclusive nor Boolean function generating circuit having input signal connections with the addend and augend input signals of the bit slice cell and output signals connected with the presumed zero carry circuit, the presumed one carry circuit and the Boolean sum circuit, the presumed zero carry circuit also having a fixed zero related logic signal input and a fixed zero related output signal that is selectively connectable with a selected one of the presumed zero carry circuit fixed zero related signal input of a higher ordered bit slice cell and the carry signal selection circuit of a higher ordered bit slice cell, the presumed one carry circuit also having a fixed one related logic signal input and a fixed one related output signal that is selectively connectable with a selected one of the presumed one carry circuit fixed one related logic signal input of a higher ordered bit slice cell and the carry signal selection circuit of a higher ordered bit slice cell, the Boolean sum circuit also including a sum signal selection logic input connectable with the carry signal selection circuit network carry output signal of a preceding bit slice cell, the carry signal selection circuit receiving input signals from the presumed zero and presumed one carry circuits and a control signal input connected with the carry signal output of a predetermined less significant bit slice cell.

BRIEF DESCRIPTIONS OF THE DRAWINGS

FIG. 1 shows a plurality of carry-select adders expanded into a tree structure.

FIG. 2a bit slice circuitry for the carry-select tree adder and FIG. 2b shows a reduced version thereof.

FIG. 3a shows a first bit slice cell circuit for a carry multiplexed adder.

FIG. 3b shows a second bit slice cell circuit for a carry multiplexed adder.

FIG. 4 shows a carry multiplexed adder in block diagram form.

FIG. 5 shows the sub-stages of a carry multiplexed adder stage useful in latter portions of the FIG. 4 adder.

FIG. 6 shows a second level sub-stage for the FIG. 4 adder.

FIG. 7 shows a third level sub-stage for the FIG. 4 adder.

FIG. 8 shows FIG. 8a and 8b.

FIG. 8a shows a multiplex circuit useful as carry-selection for the carry unit of in the FIGS. 3a and FIG. 3b bit slice circuits.

FIG. 8b shows a multiplex circuit useful for the sum unit in the FIG. 3a and FIG. 3b bit slice circuits.

DETAILED DESCRIPTION

Figure 10A:
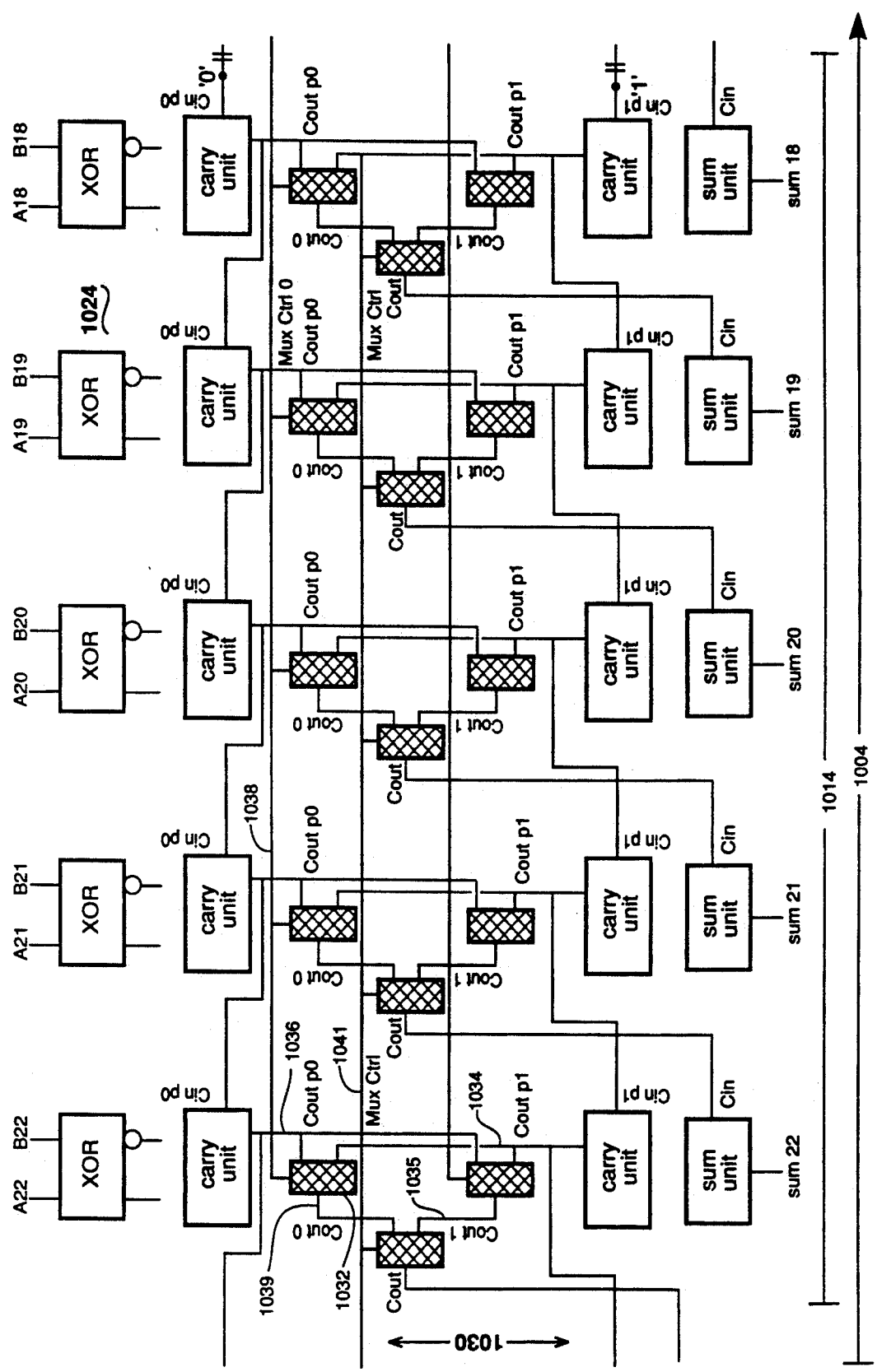
FIGS. 10a–10e show a twenty-three bit adder embodiment of the invention in five parts.
Figure 10B:
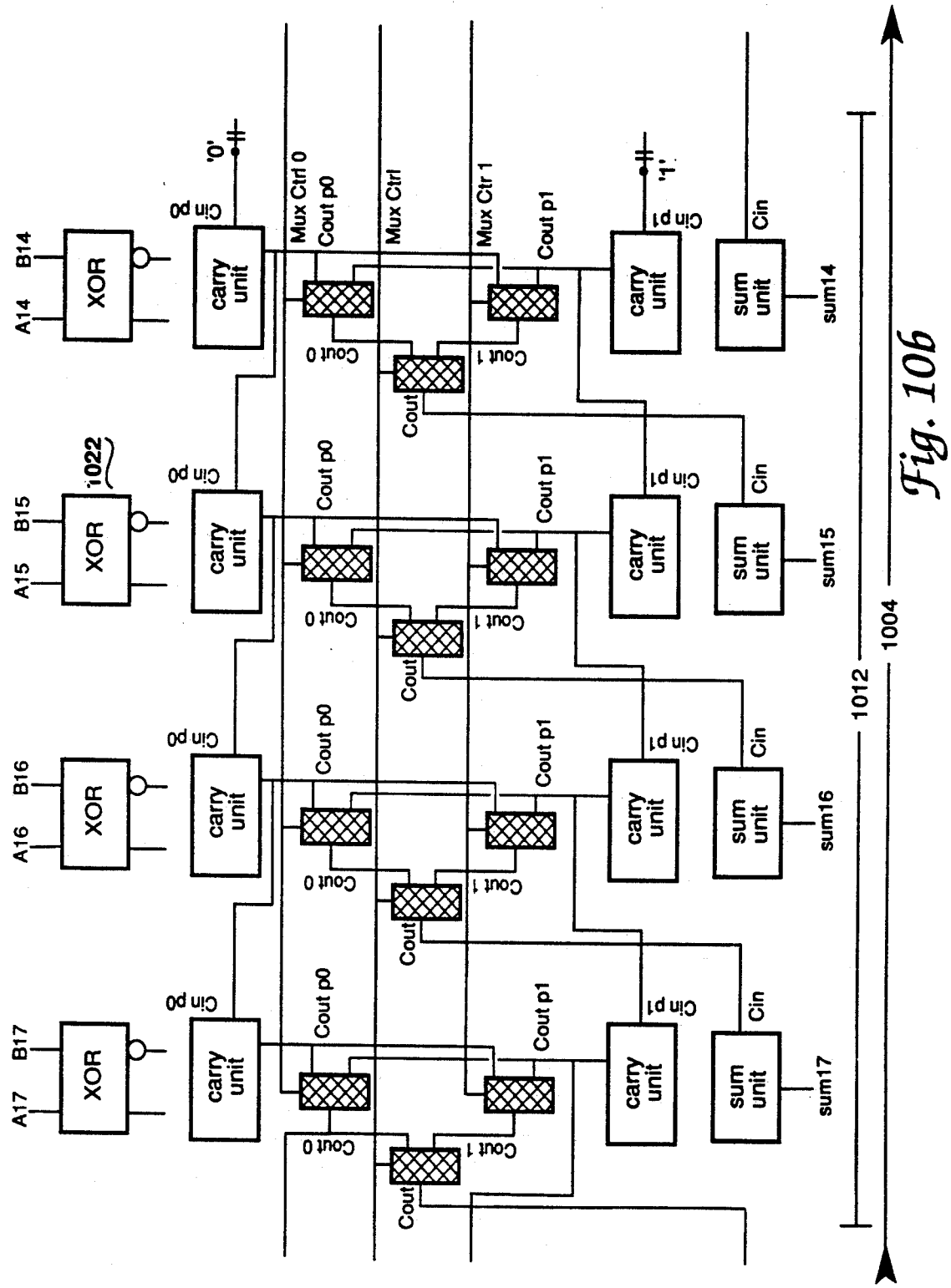
Figures 9, 10C:
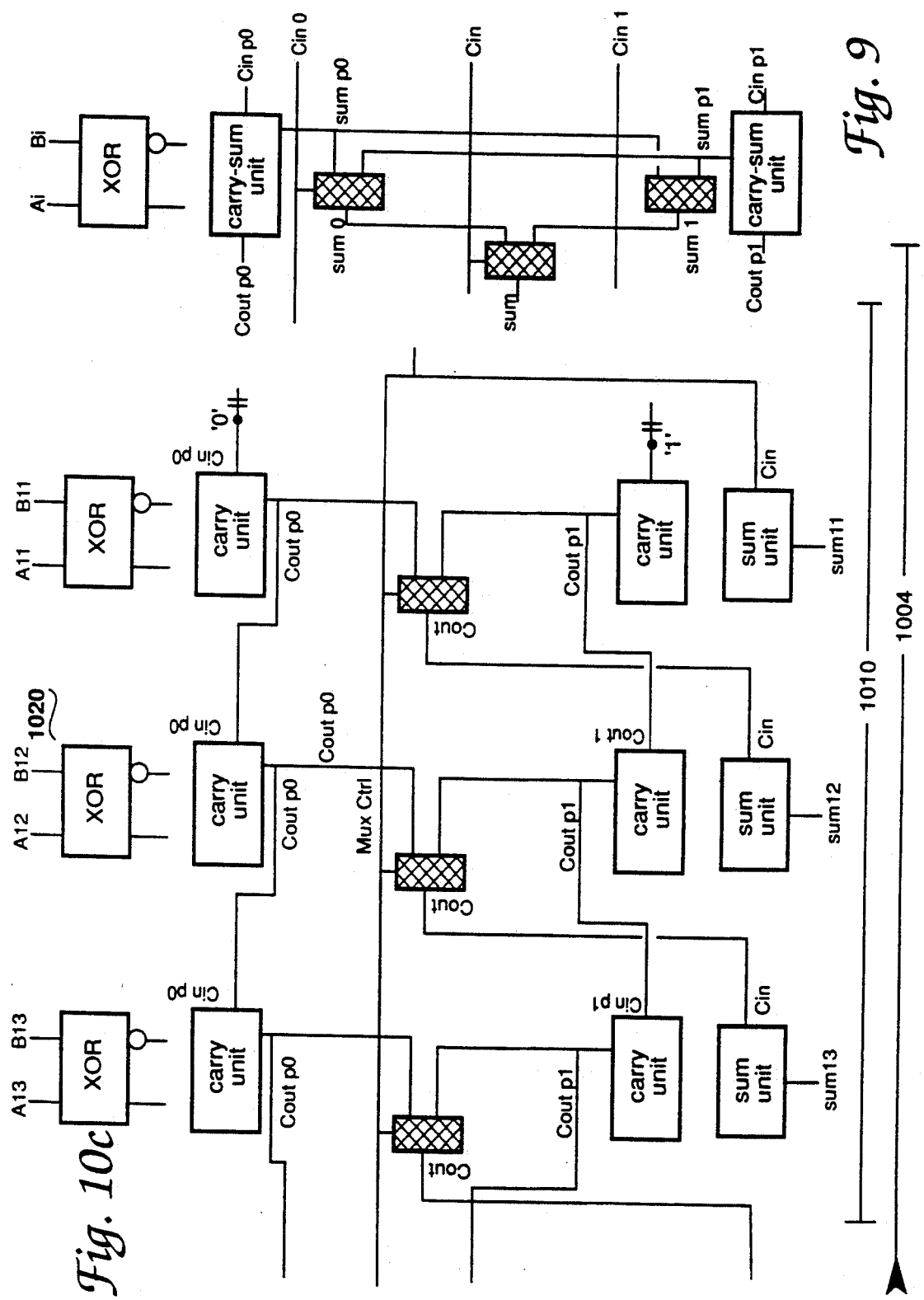
FIG. 9 shows a reduced delay adder bit slice output circuit usable in the final stage of the adder.
Figure 10D:
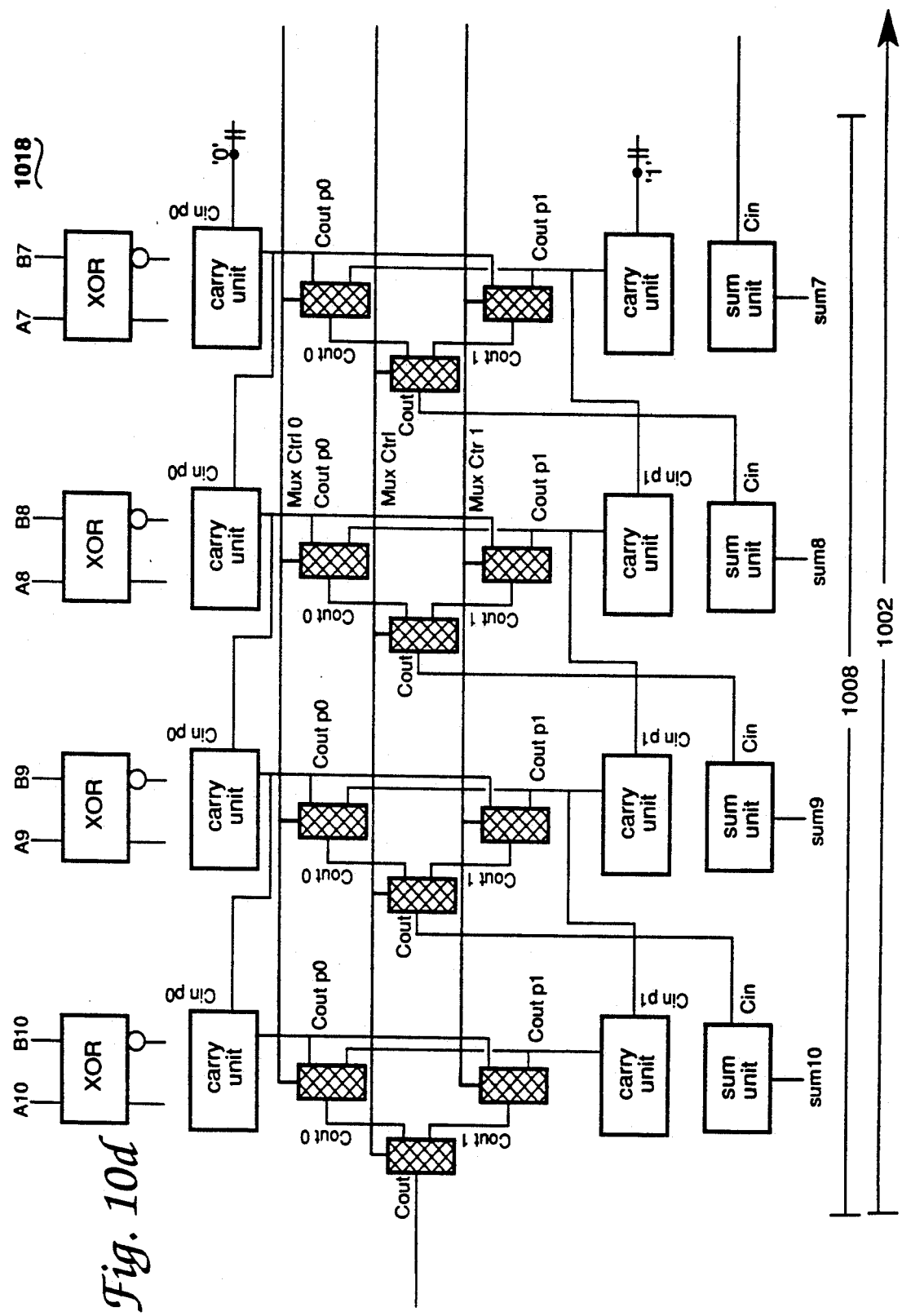
Figure 10E:
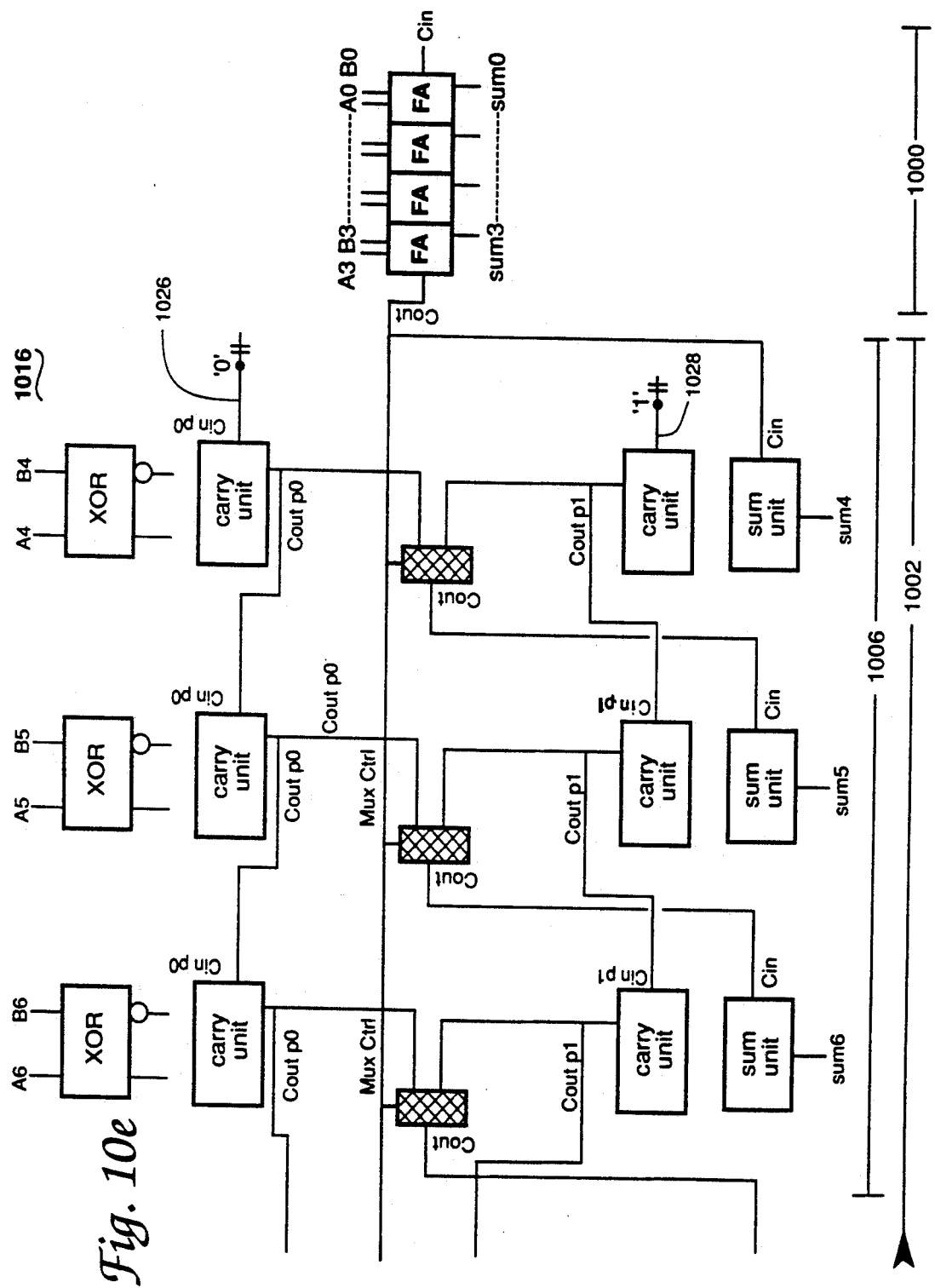

The nature of the present invention carry-multiplexed adder can be appreciated by considering a series of improvement steps which start with the architecture of the carry-select adder. The first such step is a hierarchical expansion of the carry-select adder into a tree structure as shown in FIG. 1. Each of the thick horizontal lines 100 in FIG. 1 represents a full 4 bit adder. The bubbles 102 represent multiplexers which select the correct carry signal for that segment of the addition. The numerals zero (0) and one (1) to the immediate right of the 4 bit adders at 106, for example, are the value of the presumed carry input to that adder.

The addend and augend inputs Ai and Bi are representatively shown at 108 in FIG. 1 and are identified as to bit position throughout the FIG. 1 adder tree. The addend and augend inputs respectively connect to each of one, two or four of the FIG. 1 four bit adders depending upon the adder position along the tree. The multiplexers for the sum in each FIG. 1 bit position are not shown. Bit position 17 for example, has a sum multiplexer between the upper two adders 110 and 112, the adders in the top bank, and a sum multiplexer in the bottom bank to choose the correct sum for the respective bank. There is also a multiplexer to choose which of these sums was correct and therefore the desired final output sum for the bit position.

Since the addition operation performed by adders with the same presumed carry input in FIG. 1 is the same in both the top and bottom banks, a reduction in logic gates can be achieved from the number of logic gates in a normal bit slice cell of FIG. 2a as is shown in FIG. 2b. In the FIG. 2a cell the symbol FA represents a full adder, the symbols $c_{outp0}$ and $c_{outp1}$ represent carry outputs with presumed zero and one inputs, respectively, and the blocks shown at 200 and 202 are multiplexers. In the FIG. 2a adder, the exclusive or of the addend and augend or A and B inputs is generated in each of the four FA blocks—as is known in the adder art. In the simplified FIG. 2b adder, however, this exclusive or operation is accomplished only once at 212, and the results fed to the carry sum units 204 and 210 to generate both the carry out and the sum signals for the bit position. Additionally in the simplified FIG. 2b adder the sum on the presumed "0" and presumed "1" paths 206 and 208 are computed only once, and then multiplexed or switched to produce the correct sum for the bit position.

Even though the FIG. 2b reduced adder removes most of the obviously redundant logic gates, there is still redundancy in its architecture. Much of this redundancy resides in the sum computation by both of the carry-sum units 204 and 210. This redundancy which does not contribute to the overall speed of the architecture may be removed. Achieving the sum computation in a single unit for each bit position however introduces a salient feature of the present invention—i.e., multiplex selection of the correct carry out signal for each bit position. The resulting bit slice circuitry is shown in FIG. 3.

Multiplexing selection of the correct carry out signal is therefore desirable in the resulting adder because it eliminates redundant sum logic in the adder and also accomplishes a necessary selection of the final carry output for the adder stage under consideration.

In FIG. 3 the blocks 306 and 308 designate a carry circuit, and a sum unit circuit, as are also described in the FIGS. 8a and 8b. Similarly, the symbol XOR in the block 312 represents an exclusive or circuit—as are, of course, well known in the computer art. The circle at 314 adjacent the block 312 indicates output signal inversion which in effect generates the exclusive NOR function. In the "level 3" and "level 2" cell arrangements of FIG. 3 each circuit or bit slice circuit produces, by multiplexing, the correct carry output (to be fed to the next bit position's sum unit) rather than using multiplexing to select the correct sum output, as in the carry-select adder. The Mux ctrl signals at 300, 302, and 304 in FIG. 3 are driven by the respective carry signals of preceding sub-stages and are comparable to the carry signals used to choose the sum in FIG. 2. Although not indicated in the FIG. 3 drawings, it is understood that each of the carry units 306 and 308 and the sum unit 310 in the FIG. 3a bit slice cell circuit, for example, receives the inverted and non-inverted two output signals from the exclusive or circuit of block 312.

Also shown in FIG. 3(b), is the simplified level 2 adder cell arrangement used in bit positions which require only two full adders in the carry-select tree of FIG. 1 i.e., the cell arrangement of bits 4-11 in FIG. 1.

To construct a complete adder for some number of bits, n, multiple "stages" inclusive of the FIG. 3 bit slice cells are connected together.

The significance of the terms "stage" and "sub-stage" in the carry multiplexed adder will become apparent in the material following and in connection with FIG. 10. Generally, however, all of the carry output or $C_{out}$ signals in a "stage" are available at the same time, and the output of successive "stages" settle out one unit of time after each other.

FIG. 4 shows such an n-bit carry-multiplexed adder in block diagram form and FIG. 10 shows such an adder in more detail. The first stage in FIG. 4 and FIG. 10 is an adder of few bits capacity, typically two to four, that may or may not have a carry input as dictated by the application—subtractors, for example, use a carry input to the first stage. Any adder architecture such as a ripple adder may be used for this first stage adder. The adder cells used in the first stage are called level 1 adder cells. Successive FIG. 4 stages consist of a single second level sub-stage of FIG. 3 cells followed by multiple third level sub-stages of FIG. 3a cells as shown in FIG. 5 and as also appears in FIG. 10.

In these various adder stages, a second level sub-stage is composed of one or more level two adder cells as shown in FIG. 3b and FIG. 6. The first level two adder cell in the sub-stage can be a half adder, as the carries into the carry units of the adder cell are the fixed value "0" and "1" signals respectively. The carries into the carry units of the next following second level bit-slice cell within the sub-stage are the respective zero related and one related carry output signals of the first level two cell of the sub-stage. The terms "zero related" and "zero determined" are therefore used herein to generally refer to both carry signals from a fixed value "0" connected carry unit and to carry signals from a carry unit distally connected to such a "0" connected carry unit; a similar convention is also used for one related or one determined signals.

Thus, the first level two bit slice cells in the present adder all require only a single input, the final carry out from the previous stage. The final carry out from the previous stage in fact becomes the Mux Ctrl signal in FIG. 3b and is also used by the sum unit to compute the sum for the bit position. The output signals from each bit position are the presumed zero carry input related signal $C_{outp0}$, the presumed one carry input related signal $C_{outp1}$, and the correct or finally related carry signal $C_{out}$ signals. The Mux Ctrl signal is used to choose the correct $C_{out}$ and is also passed on to the next bit position within a stage.

A third level sub-stage for the present invention adder is composed of one or more level three adder cells as shown in FIG 3b and 7. The first level three adder cell in the sub-stage can be a half adder cell as the presumed carries are known to be "0" and "1". This half adder cell receives the output of a level two adder cell or a level three adder cell. When driven by a level two adder cell, the $C_{out\,p0}$ signal drives the Mux Ctrl 0, the $C_{out\,p1}$ signal drives the Mux Ctrl 1, the Mux Ctrl signal drives the Mux Ctrl, and the Cout drives the Cin. When driven by a level three adder cell from the end of a previous third level sub-stage, the output of the first layer muxes, Cout0 and Cout:, drive mux cntrl 0 and mux cntrl 1, the $C_{out\,p0}$ and $C_{out\,p1}$ signals are not connected, as the carries are presumed to be "0" and "1" on the respective carry chains. Level three adder cells contain one XOR unit, two carry units, three multiplexers, and one sum unit.

Second and third level sub-stages are then combined to form the carry-multiplexed adder stage of FIG. 5. Just as the carry-select adder can take advantage of the increasing gate delay in each successive stage by placing more bits in successive stages so too can the presently described carry multiplexed adder.

The length of a sub-stage in the present invention adder can be referred to in terms of the number of bit slice cells within the substage. The first third level sub-stage of a stage has a length that is one greater than the length of the second level sub-stage. Successive third level sub-stages further increase in length by one bit. The length of the final third level sub-stage is one greater than the length of the final third level sub-stage from the previous stage, except for the second stage of the adder. The second stage of a carry-multiplexed adder is a stage composed of second and third level sub-stages. The length of the final third level sub-stage of the second stage is the equal in length of the first stage.

By way of further explanation of the time relationships in a carry multiplexed adder, each exclusive or-/exclusive nor circuit can be described as two parallel multiplexers and therefore take one unit of propagation time to settle. The carry unit, the sum unit and each multiplexer layer within the bit slice also take one multiplexer gate delay to settle. Since addend and augend bits all arrive simultaneously at t=0 every exclusive or/exclusive nor unit in the adder settles after one gate delay. After this first delay, the carry unit outputs $C_{outp0}$ and $C_{outp1}$ for the first bit slice of each sub-stage are settled—because the fixed inputs thereto are unchanging and the circuits await only the exclusive or/nor inputs before commencing to settle. Each successive carry unit within the substage settles after one additional gate delay per carry unit as the carry propagates through the sub-stage. At the stage level, the first stage, once its carry output is settled, provides the mux control for all of the bits of the following stage.

Similarly, after the carry from a sub-stage is settled it is used to determine the carry output of the following sub-stage. Each successive sub-stage requires one additional gate delay because of the multiplexing of the carry from the carry unit therein. Significantly, since each sub-stage in the adder requires an additional gate delay, time is provided in which that sub-stage can process an extra bit of addend and augend data. This is an underlying concept of the adder.

Similarly, each stage of the adder uses the carry out from the previous stage to determine its carry out. Since the carry out determination takes one additional gate delay, time is provided in which the stage can process an additional sub-stage of addend and augend data. This addition of an entire sub-stage of bit slice cells is in fact, a major advantage of the carry multiplex adder in comparison with the carry select adder, since the carry select adder could add only one extra bit for an equivalent gate delay.

Each added bit slice cell in a sub-stage lengthens the propagation delay by one gate delay because of the added carry unit within the sub-stage chain.

In a traditional carry-select adder, the second level structure is repeated with each successive stage adding another adder cell to the stage to take advantage of the multiplexer delay. The present carry-multiplexed adder, however, compensates for multiplexer delay by adding another third level sub-stage. This growth rate, which is in fact quadratic growth in the number of bits in a stage with respect to delay, provides significant performance advantages for the present adder.

FIG. 10 in the drawings shows a 23-bit adder embodiment of the invention which makes use of the level two and level three bit slice cells shown in FIG. 3. The five parts of FIG. 10, as FIG 10a, FIG. 10b, FIG. 10c, FIG. 10d, and FIG. 10e may be placed end to end with FIG. 10a in the left most portion for a comprehensive view of the adder. In such a view, carry signals flow from the lower order bit positions on the right toward the higher order bit positions on the left. Also, in this view, the bottom edge lines are used to indicate stage and sub-stage lengths with line continuations across junctions between figure part being indicated by the head and tail arrows along the lines and with line terminations being shown without arrows. Multiplexer circuits are shown with cross hatch shading in FIG. 10 and the symbol FA is used to represent a full adder.

The FIG. 10 adder consist of three stages, stage 1 relating to addend, augend and sum bits zero through three and indicated at 1000; stage two indicated at 1002 and including bits 4–10; and stage three indicated at 1004 and including bits 11–22.

As indicated above, the FIG. 10 stage one adder cells may be of the carry ripple or any convenient type of adder architecture. In the stage 2 portion of FIG. 10 at 1002, the first sub-stage, the sub-stage which processes bits 4–6 of the addend and augend, is fabricated from bit slice cells of the FIG. 3b type, one of these cells being indicated at 1016 in FIG. 10. The final four bits of stage 2 in FIG. 10, that is the circuitry for processing bits 7–10 of the addend augend and sum, are fabricated from FIG. 3a type of adder cell, one of these cells being indicated at 1018 in FIG. 10.

The stage three circuitry at 1004 is comprised of three bits of the level two cells shown in FIG. 3b, these cells being used for bits 11–13 as is indicated by the typical cell 1020. Following these three bits of level two circuitry are two sub-stages 1012 and 1014 comprised of level three cells of the type shown in FIG. 3a. The first of these sub-stages includes bit 14–17 and includes the typical level 3 cell indicated at 1022. The second of these level 3 sub-stages also includes 4 bits of the FIG. 3a type cells, one of these cells being indicated at 1024 in FIG. 10.

In the FIG. 10 adder each of the sub-stages 1006, 1008, 1010, 1012 and 1014 includes fixed zero and fixed one inputs for the first carry unit of the sub-stage. These inputs which may, of course, be tied directly to appropriate logic signal voltages are indicated at 1026 and 1028 for the stage two sub-stage at 1006. The output of the bit 22 cell in the sub-stage 1014 is indicated at 1030 in FIG. 10 and may be connected to the sub-stages of additional stages fabricated in the manner indicated for the FIG. 10 adder when an adder of more than 23 bits capacity is needed. Even more desirable additional bit capacity may be added to the FIG. 10 adder in the manner disclosed in the copending Scriber U.S. Air Force patent application serial number 07/649,787 which expands upon some of the concepts underlying the present adder. The contents of this copending application are hereby incorporated by reference herein.

Propagation delay time considerations determine the number of and type of cells and their locations in the FIG. 10 adder. Generally the underlying concept in these determinations is based on achieving simultaneous arrival of sub-stage carry signals and the carry-multiplexer control signal at the output multiplexer of a sub-stage in order that the correct carry output signal from the sub-stage be determined and coupled into the succeeding sub-stage. In the bit 18-22 sub-stage 1014, for example, it is desired that the carry signal propagate through the carry units of bits 18-22 and arrive on the paths 1034 and 1036 at the time of multiplexer control signal arrival on the path 1038 in order that the desired output signal from the multiplexer 1032 be obtained. The output from multiplexer 1032 in turn arrives on the path 1039 at the time of multiplexer control signal arrival on the path 1041 in order that the sub-stage 1014 output signal be generated.

Extension of the FIG. 10 adder to additional stages of the type shown in FIG. 10 and including the cells of FIG. 3 is also contemplated by the invention. Additional stages comprised of level 3 sub-stages, that are preceded by one or more level two sub-stages and connected to the sub stage 1014 output signals at 1030, may be accomplished by persons skilled in the art from the pattern shown in FIG. 10. A 57 bit adder connected in this manner is described in the thesis publication of Michael W. Scriber one of the inventors hereof. This thesis is titled "Technology Development and Circuit Design for a Parallel Laser Programmable Floating Point Application Specific Processor". This thesis was submitted to the Air Force Institute of Technology division of the U.S. Air University in partial fulfillment of the requirements for the degree of Master of Science in Computer Engineering and first placed on library shelves in the Air Force Institute of Technology in March of 1990. Access to this thesis may be achieved by contact with the Air Force of Institute of Technology at Wright-Patterson Air Force Base, Ohio 45433. The contents of this thesis document are also hereby incorporated by reference herein.

When an adder of the present invention type is implemented in the form of complementary metal oxide semiconductor (CMOS) circuitry, as is contemplated in the FIG. 10 adder embodiment, the adder may be realized through the use of seven different adder cells. These cells are based on the circuits shown in FIG. 3 but are tailored as to output transistor size and load driving ability in accordance with the cell interconnection arrangements shown in FIG. 10. The blocks of the FIG. 3 and FIG. 10 adders may be fabricated in any appropriate technology without changes to the architecture shown in FIG. 3 and FIG. 10, however.

In one possible embodiment arrangement of the FIG. 10 adder invention, seven different adder cells form a library which is convenient for chip fabrication. In this arrangement of the FIG. 10 adder, the first of these seven cells is exemplified by the cell used for the A4 and B4 bit where the fixed zero and one inputs to the carry unit are employed. An additional adder cell type is used for the circuitry of the A5 and B5 bits. The third of the different cell types is used for the A6 and B6 circuitry where, for example, the extra loading imposed on the carry units requires driving transistor accommodation. The fourth different adder cell may be used in the circuitry of the A7 and B7 bits where the combination of three multiplexers and fixed carry unit inputs are unique. The fifth of the adder cells can be used in mechanizing the A8,B8 cell, while the sixth cell may be used at the A10,B10 location and the seventh cell at the A17,B17 location.

In the notation system or the "equations" described in the copending Scriber patent application the FIG. 10 exemplary adder herein may be described by the "equation"

$$33333,3333,222|3333,222|1111 = 23 \text{ bits} \tag{1}$$

where the symbol "|" represents a stage boundary, the symbol "," represents a sub-stage boundary, and the adjacent numbers indicate sub-stage level identifications and the output-to-input connection of adjacent sub-stages.

Although this adder provides a good example of and use of the present invention and is indeed functional and improved over previous adders in the herein-recited ways, it should be realized that this particular configuration of sub-stages does not make optimum use of the time it employs for performing its accomplished twenty-three bit addition.

In particular, the use of four level one sub-stages in the first stage and the illustrated particular combinations of level two and level three cells following this stage are each less than the optimum arrangement of the herein disclosed adder. The optimum arrangement of the present adder invention, in fact, employs two level one sub-stages (of, for example, ripple adder configuration) and is then increased into larger bit capacity sizes in accordance with a specific growth pattern combination of level two and level three sub-stages.

As an example of this growth pattern using the above "equation" notation, the following adder may be considered:

$$33333,3333,333,33,2|33333,333,33,2|333,33,2|33,2|$$
$$11 = 36 \text{ bits} \tag{2}$$

By examination, it is apparent that the rule for this growth pattern includes the concept that each successive adder stage can incorporate a final sub-stage of one more bit slice cell content than the preceding stage, with this added bit slice cell being of the most complex or level three type as herein disclosed. This pattern and the 36-bit adder above may be extended as desired.

Since the final stage of an adder according to this rule allows for a large bit capacity—in fact, the largest bit capacity in the adder, a non-optimized partial use of the final stage's potential bit capacity may be appropriate in many uses of the invention. FIG. 10 may be considered therefore, an example of such non-optimized and partial usage.

An adder using different sub-stage arrangements and providing for even more effective bit capacity use of the consumed addition time is disclosed in the herein referred-to Scriber application. The growth pattern of the Scriber application adder notably expands upon that of the present invention adder, however.

The significance of the present invention adder may be more fully appreciated by comparison of the adder's performance with that of more conventional adder arrangements. As shown below both the speed capability and the circuit area requirements of the present adder are attractive in comparison with more conventional adder arrangements.

The carry-multiplexed adder can be performance evaluated using the same methodology as commonly employed for other adders. In regards to time, the carry-multiplexed adder computes a n-bit addition sum in $$\text{Time}(n) = (\text{1st stage time}) + (\text{\#stages} - 1) \tag{3}$$

This equation is comparable to the time equation for the carry-select adder, however, the number of bits per stage can be significantly greater than in the carry-select adder. The equation for the number of bits, given the number of stages, is $$n = 2 + \sum_{K=2}^{s} \sum_{J=1}^{k} j = 2 + \tag{4}$$

$$\sum_{K=2}^{s} k(k+1)/2 = (s^3 + 3s^2 + 2s + 6)1/6$$

Solving for the real root of s gives $$s = ([1/2(6n + r^{1/2} - 6]^{2/3} - [1/2(6n + r^{1/2} - 6)]^{1/2} + 1/3)/[1/2(6n + r^{1/2} - 6]^{1/3}) \tag{5}$$

where $r = 1/27 (972n - 1944n + 968)$ (6)

The propagation time for the carry-multiplexed adder, assuming the use of a two bit ripple-carry adder for the first stage and successive stage construction with a single bit in the second level sub-stage is $$\text{time}(n) = 6 + -1 = s + 5 \tag{7}$$

When analyzing the area requirements for a carry-multiplexed adder the three distinct cell types may be taken into account. The level one adder cell may be a ripple adder containing six gates per bit. The level two adder may also contain six gates per bit as described above. The level three cell is the same as a level two cell with the addition of two select multiplexers, for a total of eight gates. The total number of gates is thus, $$\text{gates}(n) = 8 \times (\text{level 3 cells}) + 6 \times (\text{level 2 cells}) + 6 \times (\text{level 1 cells}) \tag{8}$$

where $$\text{\#level 3 cells} = n - s - 1 \tag{9}$$

$$\text{\#level 2 cells} = s - 1 \tag{10}$$

$$\text{\#level 1 cells} = 2 \tag{11}$$

for the assumptions stated. Therefore, the total number of gates is $$\text{gates}(n) = 8n - 2s - 2 \tag{12}$$

and $$\text{gate-time}(n) = (8n - 2s - 2)(s + 5) \tag{13}$$

The value of s is given above. These equations show that the carry-multiplexed adder is of the order (n) in area, of the order ($n^{4/3}$) in area-time complexity and clearly indicate advantages of the carry-multiplexed adder architecture. These advantages remain even if multiplexers are counted as three gates rather than 1. Similarly, the order of the metrics for a ripple-carry adder do not change if it is implemented using multiplexers, although the gate count decreases to 4 for such implementations.

Figure 11:
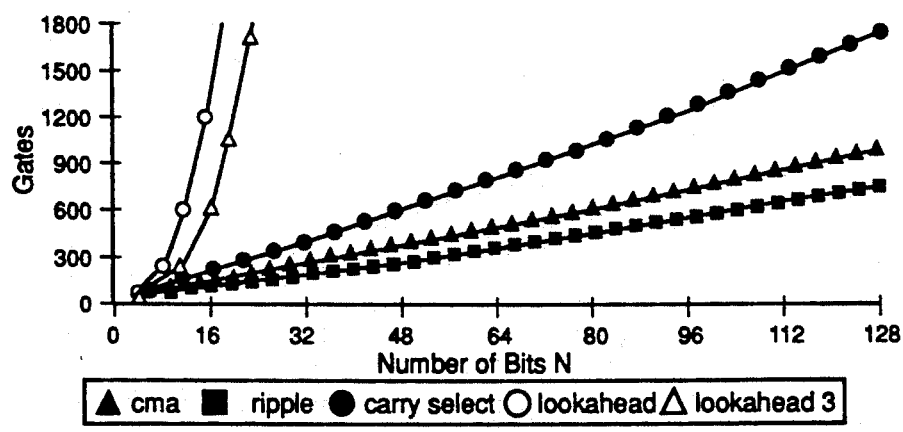
FIG. 11 shows the growth of logic gate count with bit count for several adder types.
Figure 12:
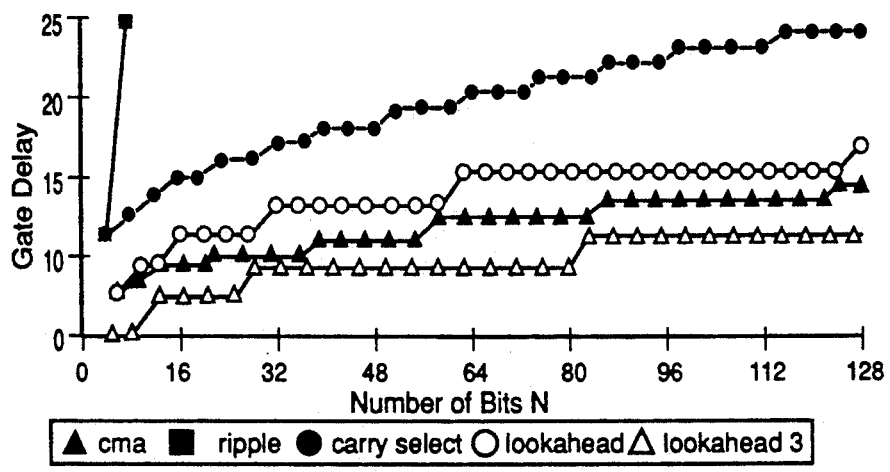
FIG. 12 shows the growth of delay time with bit count for several adder types.
Figure 13:
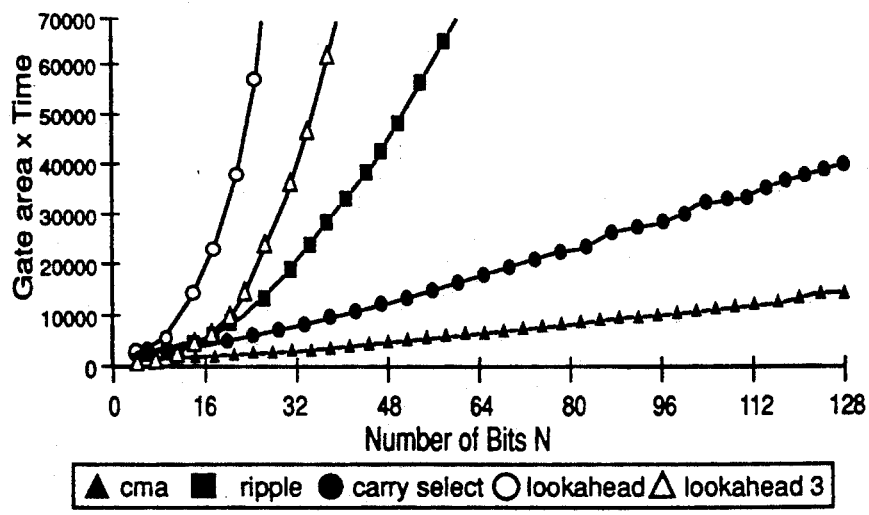
FIG. 13 shows the growth of the gate x area-time product with bit count for several adder types.

The plots shown in FIGS. 11, 12, and 13 show the area, time, and area-time performance of the present and four other adder architectures. These figures include plots for the carry-multiplexed adder (cma), the ripple-carry adder, the carry-select adder, and the carry-look-ahead adder implemented with gates having a fan-in of two (look-ahead) and a fan-in of three (look-ahead3). The plots are for adders of width 4 to 128 bits. As expected, the area for a full carry-look-ahead adder quickly goes off scale. The area of the carry-multiplexed, carry-select, and ripple carry adders are all of the order (n) but have different area multiplying constants. The carry-multiplexed adder is larger than a ripple-carry adder but smaller than a carry-select adder. The linear area growth of these three adders makes them attractive for Very Large Scale Integration (VLSI) implementation with the present invention adder being next to the best of the group.

FIG. 12 shows the comparison of the time required by each architecture to compute the sum for the illustrated number of bits. The ripple-carry adder has an order of (n) growth in time and is FIG. 12 curve quickly goes off scale in comparison to the time required by the other architectures.

The carry-multiplexed adder is faster than a carry-look-ahead adder implemented with two-input gates. A carry-look-ahead adder implemented with three-input gates is slightly faster than the carry-multiplexed adder, but requires more area and does not have a desirable regular structure.

FIG. 13 shows the area-time metric for the five considered types of adders. Under this metric both the carry-select and the present carry-multiplexed adders show desirable performance with the carry-multiplexed adder clearly being the best architecture. The probable choice for adders larger than four bit, and most certainly the choice for adders larger than eight bits, is the carry-multiplexed adder in the FIG. 13 metric.

The carry-multiplexed adder has been implemented, in a test chip for proof of concept and for use in a prototype IEEE double precision floating point adder. The carry-multiplexed adder has a very regular structure, using just seven different adder cells to implement an adder of any size as described above. The adder of the present invention has also been successfully embodied into a 57 bit adder configured into a (654321-54321-4321-321-21-2) architecture and implemented on a MOSIS two micron CMOS tiny chip.

The herein disclosed adder architecture has also been used in a prototype IEEE double precision floating point adder also implemented in MOSIS two microns CMOS technology in a 64 pin package. The floating point adder used the present carry-multiplexed adder as the primary adder for the floating point addition and also a configuration of the carry-multiplexed adder as a comparator. When used as a comparator, all sum units are removed and the multiplexers are removed from all bit positions except the most significant bit of each sub-stage.

The disclosed carry-multiplexed adder therefore provides a faster adder architecture having a minimal area-time product. It is capable of computing the addition of two binary numbers in a time equivalent to that of a full carry-look-ahead adder and may be implemented in an area slightly larger than that of a ripple-carry adder. The carry multiplexed adder has a desirable regular structure of component cells and enables the implementing of adders of any size using a small first stage adder of a few bits and for example seven CMOS VLSI carry-multiplexed adder cells.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Propagation time conserving parallel path adder apparatus comprising the combination of:

a binary adder first stage including multiple bit slice cells which each have addend and augend input signals plus sum and carry output signals;

a second binary adder stage including;

a binary adder sub-stage having at least one bit slice cell which includes an exclusive Boolean function circuit, a presumed zero carry circuit, a presumed one carry circuit, a Boolean sum circuit, and a carry signal selection switch circuit therein;

said exclusive Boolean function circuit including logic circuit means input receptive of addend and augend input signals of said bit slice cell and output connected with input ports of said Boolean sum circuit and with said presumed zero and presumed one carry circuits for generating exclusive or and exclusive nor signal combinations of said addend and augend signals;

said presumed zero carry circuit including logic circuit means, input receptive of a predetermined selection one of a fixed zero signal and a fixed zero determined signal related tentative carry output signal of said bit slice cell;

said presumed one carry circuit including logic circuit means, input receptive of a predetermined one of a fixed one signal and a fixed one determined signal from said preceding bit slice cell and said exclusive or and exclusive nor combination signals, for generating a one signal related tentative carry output signal of said bit slice cell;

said Boolean sum circuit including logic circuit means receptive of a carry signal output from said preceding bit slice cell and said exclusive or exclusive nor combination signals for computing Boolean sum bit output signals of said second level binary adder sub-stage bit slice cell;

said selection switch circuit including logic circuit means input receptive of said zero signal related tentative carry and one signal related tentative carry signals for selecting a carry output signal of said bit slice cell in predetermined response to said carry signal first level sub-stage output signal.

2. The adder apparatus of claim 1 wherein said binary adder first stage bit slice cells also comprise first level sub-stages and wherein said second binary adder stage sub-stage is identified as a second level sub-stage and further including:

a second binary adder stage including;

a third level binary adder sub-stage having a bit slice cell portion thereof which includes an exclusive Boolean function circuit, a presumed zero carry circuit, a presumed one carry circuit, a Boolean sum circuit, and an interconnected pyramid of carry signal selection switch circuits therein;

said third level binary adder sub-stage bit slice cell exclusive Boolean function circuit including logic circuit means input receptive of addend and augend input signals of said bit slice cell and output connected with input ports of said carry circuits, and said Boolean sum circuit, for generating exclusive or and exclusive nor signal combinations of said addend and augend signals;

said third level binary adder sub-stage bit slice cell presumed zero carry circuit including logic circuit means, input receptive of a predetermined one of a fixed zero signal and a fixed zero determined signal from a preceding bit slice cell, for generating a zero signal related tentative carry output signal of said bit slice cell;

said third level binary adder sub-stage bit slice cell presumed one carry circuit including logic circuit means, input receptive of a predetermined one of a fixed one signal and a fixed one determined signal from said preceding bit slice cell and said exclusive or and exclusive nor combination signals and said exclusive or and exclusive nor combination signals, for generating a one signal related tentative carry output signal of said bit slice cell;

said third level binary adder sub-stage bit slice cell Boolean sum circuit including logic circuit means receptive of both a carry signal output from a preceding bit slice cell and said exclusive or exclusive nor combination of signals for computing Boolean sum bit output signals of said third level binary adder sub-stage bit slice cell;

said third level binary adder sub-stage interconnected pyramid of carry signal selection switch circuits also including pyramidal apex located logic circuit means input receptive of said presumed zero related and presumed one related tentative carry signals for selecting a carry output signal of said third level adder sub-stage bit slice cell in predetermined response to a final bit slice cell carry output signal of a preceding lesser bits processing adder stage.

3. The adder apparatus of claim 2 wherein said adder first stage is comprises of a plurality of said first level sub-stages of bit slice cells followed by a second level sub-stage having a bit slice cell and followed by a plurality of third level sub-stage bit slice cells.

4. The adder apparatus of claim 3 further including additional stages also comprised of pluralities of said second and third level bit slice cells.

5. The adder apparatus of claim 1 wherein said predetermined selections between fixed zero and fixed zero determined signals and between fixed one and fixed one determined signals are determined by addend and augend bit location of said second level bit slice cell in said second level sub-stage with carry circuits of first bit slice cell in said sub-stage receiving fixed zero and fixed one signals and subsequent bit slice cell carry circuits receiving fixed zero determined and fixed one determined signals from a preceding bit slice cell.

6. Binary adder apparatus comprising the combination of:
an adder bit slice cell having an exclusive or and exclusive nor Boolean function generating circuit, a presumed zero carry circuit, a presumed one carry circuit, a Boolean sum circuit, and a carry signal selection circuit;
said exclusive or and exclusive nor Boolean function generating circuit having input signal connections with addend and augend input signals of said bit slice cell and output signals connected with said presumed zero carry circuit, said presumed one carry circuit, and said Boolean sum circuit;
said presumed zero carry circuit also having a fixed zero related signal input and fixed zero related output signal port means for driving a selected one of, a presumed zero carry circuit fixed zero related signal input of a next higher bit slice cell, a carry signal selection circuit control input of a next higher bit slice cell and no other presumed zero carry circuit signal input;
said presumed one carry circuit also having a fixed one related signal input and fixed one related output signal a presumed one carry circuit fixed one related signal input of a next higher bit slice cell, a carry signal selection circuit control input of a next higher bit slice cell;
said Boolean sum circuit also including input means for receiving a carry signal selection circuit output signal of a preceding bit slice cell and no other presumed one carry circuit signal input;
said carry signal selection circuit receiving input signals from said presumed zero and presumed one carry circuits and selectably receiving a control signal from a carry signal output of a predetermined less significant stage.

7. The adder apparatus of claim 6 further including a plurality of said bit slice cells organized into a plurality of propagation delay determined adder stages wherein each stage comprises sub stage grouped bit slice cells of predetermined differing second level and third level carry signal selection circuit configuration and sequence.

8. The adder apparatus of claim 7 wherein signals from said presumed zero and presumed one carry circuit output signal driver port means are connected as a control signal with carry signal selection circuits of a next higher ordered higher level sub-stage of bit slice cells when said bit slice cell is a last bit slice cell of a sub-stage and connected with presumed zero carry circuit fixed zero related signal input of a next higher ordered bit slice cell when said bit slice cell is other than a last bit slice cell of a sub-stage.

9. The adder apparatus of claim 8 wherein an array of second level bit slice cells includes bit slice cells each having carry signal input nodes that are directly connected with the output signals of said presumed zero and presumed one carry circuits.

10. The adder apparatus of claim 9 wherein said third level bit slice cell carry signal selection circuit includes first and second level commutating circuits wherein a pair of first level commutating circuits each receive signal inputs from said presumed zero and presumed one carry circuits and have control signal inputs connected with signal inputs of a preceding sub-stage final commutating circuit and have a second level commutating circuit controlled by a carry signal output of a preceding adder stage.

11. The adder apparatus of claim 7 further including first level bit slice cells which are ripple adder cells having an output port connected with said plurality of propagation delay determined adder stages.

12. The adder apparatus of claim 7 wherein said fixed zero related and fixed one related logic input signals are zero and one signals for bit slice cells located in a low bit slice position of each said sub-stage and are zero and one related carry signals outputs from a preceding bit slice cell for bit slice cells located above said low bit slice position.

13. Selective adder apparatus comprising the combination of:
a first adder stage having addend, augend, and carry input ports for a first predetermined number of bits and also having carry output and sum output signal ports;
second and subsequent adder stages having predetermined numbers of adder bit slice cells each of which include a sum generating circuit and a pair of carry signal generating circuits and multiplexer means for selecting correct carry signal generating circuit output signals, with a multiplexer means selected carry output signal of each bit slice cell being connected as a carry input signal to a sum circuit of a next higher bit slice cell;
said multiplexer means selected carry output signal of a final bit slice cell in each said adder stage being also connected with succeeding carry multiplexer means of each bit slice cell in a next stage of said adder apparatus as a control signal therefor.

14. The adder apparatus of claim 13 wherein said first adder stage includes a plurality of ripple carry adder bit slice cells.

15. The adder apparatus of claim 13 wherein said second and subsequent stages include an exclusive function processing circuit connected with addend and augend input signals of said bit slice cell and wherein said adder bit slice cell sum generating circuits each also include signal ports connected with an output signal of said exclusive function processing circuit.

16. The adder apparatus of claim 13 wherein said second and subsequent adder stage bit slice cells include a plural layered tree of multiplexer circuits with a final multiplexer circuit of said tree being controlled by a carry output signal of a final bit slice cell of a preceding adder stage.

17. The adder apparatus of claim 16 wherein said plural layered tree of multiplexer circuits includes a first layer pair of multiplexers controlled by respective predetermined presumed zero related and presumed one related carry signal of a predetermined preceding adder sub-stage.

18. The method for organizing a multiple staged selective binary adder of the type wherein stages of successively higher ordered bit slice cells after an n bit initial stage include a plurality of sub-stages of predetermined bit slice cell content, said method comprising the steps of:
generating first presumed zero determined and first presumed one determined carry signals in a first sub-stage of a stage of said adder;
concurrently therewith generating second presumed zero determined and second presumed one determined carry signals in a second sub-stage of said stage;

performing in each bit slice cell of said second sub-stage a two output signal generating first level section between said second presumed zero and said second presumed one determined carry signals in response to first presumed zero and first presumed one determined carry signals from said first sub-stage;

whereby said two output signal inclusive first level selection signals are available for use after a propagation delay time of carry circuits in each bit slice cell of said first sub-stage plus a delay time of said second sub-stage two output signal generating first level selection; and performing in each bit slice cell of said second sub-stage a second level selection between said first level selection carry signals in response to a carry signal output of a preceding stage of said adder;

whereby an output signal of said second level selection is available for use after a second combined carry signal propagation time of said n bit initial stage with a delay time of said second level selection.

19. The method of claim 18 wherein said first and second sub-stages comprise a second adder stage and further including the step of selecting a number n of bit slice cells in said initial stage and a number of bit slice cells in said first sub-stage of said second stage to equate said first combined propagation delay time with said second combined carry signal propagation time.

20. The method for performing binary addition of addend bit and augend bit inclusive signals in an adder comprising the steps of:

dividing a low bit to high bit succession of addend signal and augend signal processing bit slice cells according to predetermined criteria into a plurality of adder stages each having a plurality of sub-stages comprised of a plurality of bit slice cells;

segregating an addition-included determination of carry signal from an addition-included determination of sum signal in both time and circuit portion within each said bit slice cell;

combining in each of said bit slice cells, addend and augend input data of said bit slice cell with, lower level bit slice cell to bit slice cell propagating, and similarly therein combined, presumed one carry signals which originate at an immediately preceding sub-stage boundary;

merging in each of said bit slice cells addend and augend input data of said bit slice cell with, lower level bit slice cell to bit slice cell propagating and similarly therein merged, presumed one carry signals originating at said immediately preceding sub-stage boundary;

selecting in stage groups of bit slice cells one of said finally propagated carry signals as a correct carry output of each said bit slice cell;

said selecting being in response to carry output signal selection in an immediately preceding adder stage; and performing a sum signal computation in each said bit slice cell in response to carry signal selection in an adjacent preceding bit slice cell.

21. The method of claim 20 wherein said selecting includes a first level selection in response to carry output signal selection in bit slice cells of an immediately preceding adder sub-stage and a second level selection in response to carry output signal selection in an immediately preceding stage whenever each sub-stage plurality of bit slice cells is a second or subsequent sub-stage of an adder stage and omitting said second level selection whenever said each sub-stage plurality of bit slice cells is a first sub-stage of an adder stage.

22. Adder apparatus for performing binary addition of addend bit and augend bit inclusive signals comprising:

an array of low bit to high bit organized addend bit signal and augend bit signal summing bit slice cells divided according to predetermined carry signal propagation time criteria into a plurality of stages each having plural sub-stages of bit slice cells;

means in each bit slice cell for combining addend and augend input data of said bit slice cell with a lower level bit slice cell to bit slice cell propagating and similarly combining presumed zero carry signal having origination at an immediately preceding sub-stage boundary;

means in each bit slice cell for combining addend and augend input data of said bit slice cell with a lower level bit slice cell to bit slice cell propagating and similarly combining presumed one carry signal having origination at said immediately preceding sub-stage boundary;

switching means in each bit slice cell for selecting in stage groups of bit slice cells one of said propagated carry signals as a correct carry output of said bit slice cell;

said selecting being in response to carry output signal settling in an immediately preceding adder stage; and means in each said bit slice cell for performing sum signal computation in response to carry output signal settling in an adjacent preceding bit slice cell.

23. Selective adder apparatus comprising:

a first adder stage including a low bit to high bit succession of addend bit and augend bit summing bit slice cells; and a second adder stage including a continued succession of bit slice cells disposed into a combination of second level and third level sub-stages;

each said second level sub-stage including means for generating a sum signal, means for generating a presumed zero related tentative carry signal, means for generating a presumed one related tentative carry signal and single level multiplexing means for selecting between said tentative carry signals in response to a carry output signal of said first adder stage;

said third level sub-stage including means for generating a sum signal, means for generating a presumed zero related tentative carry signal, means for generating a presumed one related tentative carry signal and two level multiplexing means for selecting between said tentative carry signals in first response to tentative carry input signals to a final one of said single level multiplexing means in said second level sub-stage and in second response to said carry output signal of said first adder stage.

24. The adder apparatus of claim 23, wherein said first adder stage is comprised of two first level bit slice cells each represented by a numeral 1, said second adder stage second level sub-stage includes a second level bit slice cell represented by a numeral two, said third level sub-stage includes a third level bit slice cell represented by a numeral 3, an interconnection boundary between stages is represented by a symbol "|" and an interconnection boundary between non-final sub-stages of a stage is represented by a symbol "," and wherein said thereby represented by slice cells, sub-stages, and stages are disposed in an order of:

33,2|11.

25. The adder apparatus of claim 24 further including a third adder stage comprised of second third level bit slice cells and wherein said third stage inclusive adder is disposed in an order of:

333,33,2|33,2|11.

26. The adder apparatus of claim 25 further including a fourth adder stage comprised of second and third level bit slice cells and wherein said fourth stage inclusive adder is disposed in an order of:

3333,333,33,2|333,33,2|33,2|11.

27. The adder apparatus of claim 26 further including a fifth adder stage comprised of second and third level bit slice cells and wherein said fifth stage inclusive adder is disposed in an order of:

33333,3333,333,33,2|3333,333,33,2|333,33,2|33,2|1-
1.

28. The adder apparatus of claim 27 further including addition adder stages comprised of second and third level bit slice cells and wherein said additional stages are disposed according to a continuation of said claim 27 numeric and symbolic progression and wherein each successively added stage repeats the symbol sequencing of its preceding stage and also includes an additional high bit end disposed level 3 sub-stage having an additional bit slice cell over lower bit connected sub-stages.

* * * * *